US012636226B1

(12) United States Patent
Cronkright

(10) Patent No.: US 12,636,226 B1
(45) Date of Patent: May 26, 2026

(54) HEADACHE RELIEF HEADBAND WITH TARGETED PRESSURE POINTS

(71) Applicant: Cam Daniel Cronkright, Chandler, AZ (US)

(72) Inventor: Cam Daniel Cronkright, Chandler, AZ (US)

( * ) Notice: Subject to any disclaimer, the term of this patent is extended or adjusted under 35 U.S.C. 154(b) by 33 days.

(21) Appl. No.: 19/176,344

(22) Filed: Apr. 11, 2025

(51) Int. Cl.
*A61H 39/04* (2006.01)

(52) U.S. Cl.
CPC ..... *A61H 39/04* (2013.01); *A61H 2201/0107* (2013.01); *A61H 2201/0157* (2013.01); *A61H 2201/1607* (2013.01); *A61H 2201/165* (2013.01); *A61H 2201/168* (2013.01); *A61H 2205/027* (2013.01); *A61H 2205/028* (2013.01)

(58) Field of Classification Search
CPC .......................... A61H 39/04; A61H 2205/028
See application file for complete search history.

(56) References Cited

U.S. PATENT DOCUMENTS 5,115,769 A * 5/1992 Fiorini ............... A61H 23/0263 601/71
5,611,771 A * 3/1997 Taylor ................ A61H 23/0263 601/48
2006/0142675 A1* 6/2006 Sargent .................. A61H 39/04 601/134

* cited by examiner

*Primary Examiner* — Todd J Scherbel
(74) *Attorney, Agent, or Firm* — Baker Law Firm

(57) ABSTRACT

The invention relates to a therapeutic headband designed to relieve headaches, migraines, and tension through targeted pressure application. The headband applies pressure to acupressure points along the temples and the area in front of the ears, areas commonly associated with headache relief. The headband is worn comfortably around the head, with adjustable features that allow users to customize the pressure applied to each point.

5 Claims, 10 Drawing Sheets

FIG.2A
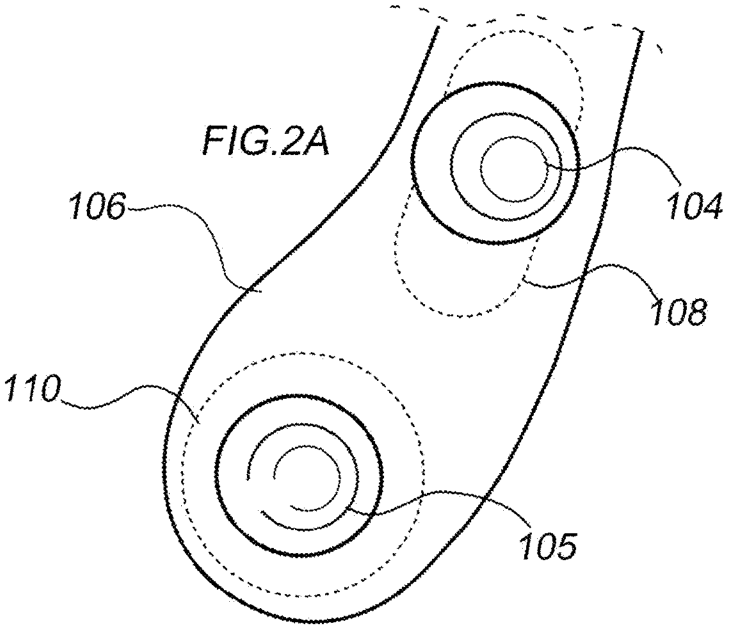
FIG.2B
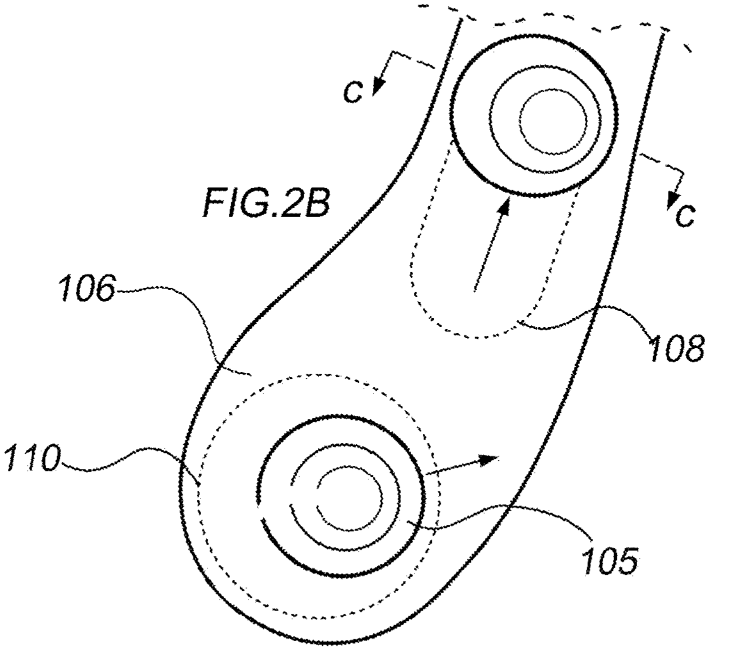
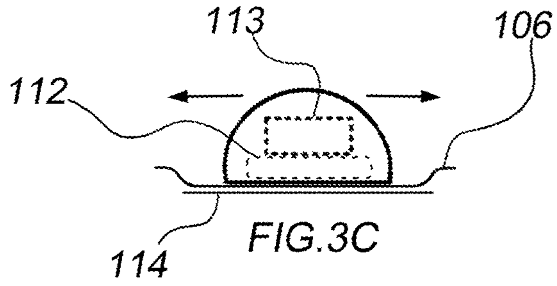
FIG.3C
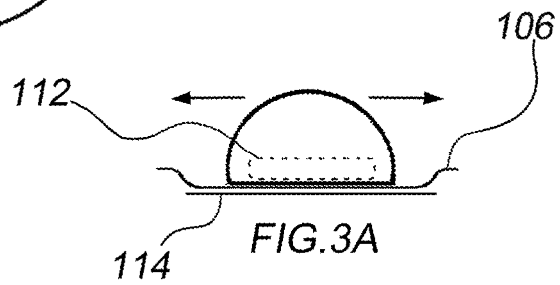
FIG.3A

HEADACHE RELIEF HEADBAND WITH TARGETED PRESSURE POINTS

FIELD OF THE INVENTION

The invention relates to acupressure devices, particularly those intended to be worn on the head.

BACKGROUND

Headaches and migraines are common conditions that affect millions of individuals worldwide, significantly impacting daily activities and overall quality of life. Traditional treatment methods for headache relief include over-the-counter and prescription medications, lifestyle adjustments, and alternative therapies such as acupuncture and massage. However, pharmaceutical solutions often come with side effects and are not always effective for every individual. Additionally, alternative therapies may require professional assistance, making them less accessible for regular use. Pressure point therapy has been widely recognized as an effective non-invasive approach to headache relief. Studies indicate that applying pressure to specific points on the head, particularly around the temples, forehead, and areas near the ears, can alleviate tension, promote relaxation, and reduce headache intensity. Several therapeutic devices exist in the market that incorporate pressure-based relief, including massaging headbands, acupressure bands, and electrical nerve stimulation devices. However, these products often have limitations—some offer only fixed pressure points, while others rely on electrical stimulation or cooling therapy, which may not be suitable for all users.

Market research indicates an increasing demand for non-pharmaceutical headache relief solutions. The global migraine treatment devices market is projected to grow significantly, driven by consumer preference for drug-free, self-administered therapies. Many commercially available products, such as the TheraICE Headache Relief Cap, Accuswede Acupressure Headband, and Sharper Image Massaging Headband, focus on cooling, vibration, or fixed pressure points, limiting their adaptability to different users' preferences. While some of these products provide acupressure features, they do not allow for individualized pressure adjustment or the ability to target multiple areas simultaneously.

The present invention seeks to address these limitations by introducing a therapeutic headband that combines customizable, targeted pressure points with a user-adjustable mechanism to provide headache and migraine relief. Unlike existing designs, this headband enables precise pressure modulation on key headache relief areas, including the temples and the regions in front and behind the ears. The adjustable nature of the headband allows users to personalize their experience, offering enhanced comfort and effectiveness without relying on electrical stimulation or cooling methods. By providing a simple, non-invasive, and adaptable approach, this invention presents an innovative solution for individuals seeking an effective and convenient method for managing headaches and tension in everyday life.

BRIEF DESCRIPTION OF THE DRAWINGS

FIG. 2A is an enlarged detail view of call-out (2) in FIG. 1;

FIG. 2B is another enlarged detail view of call-out (2) in FIG. 1;

FIG. 3A is a cross-sectional view taken along lines c-c in FIG. 2B;

FIG. 3C is a cross-sectional view taken along lines c-c or d-d in FIG. 2B or 2D and includes a vibratory element inside of a protrusion;

LISTING OF THE NUMBERED REFERENCE ELEMENTS

Figure 1:
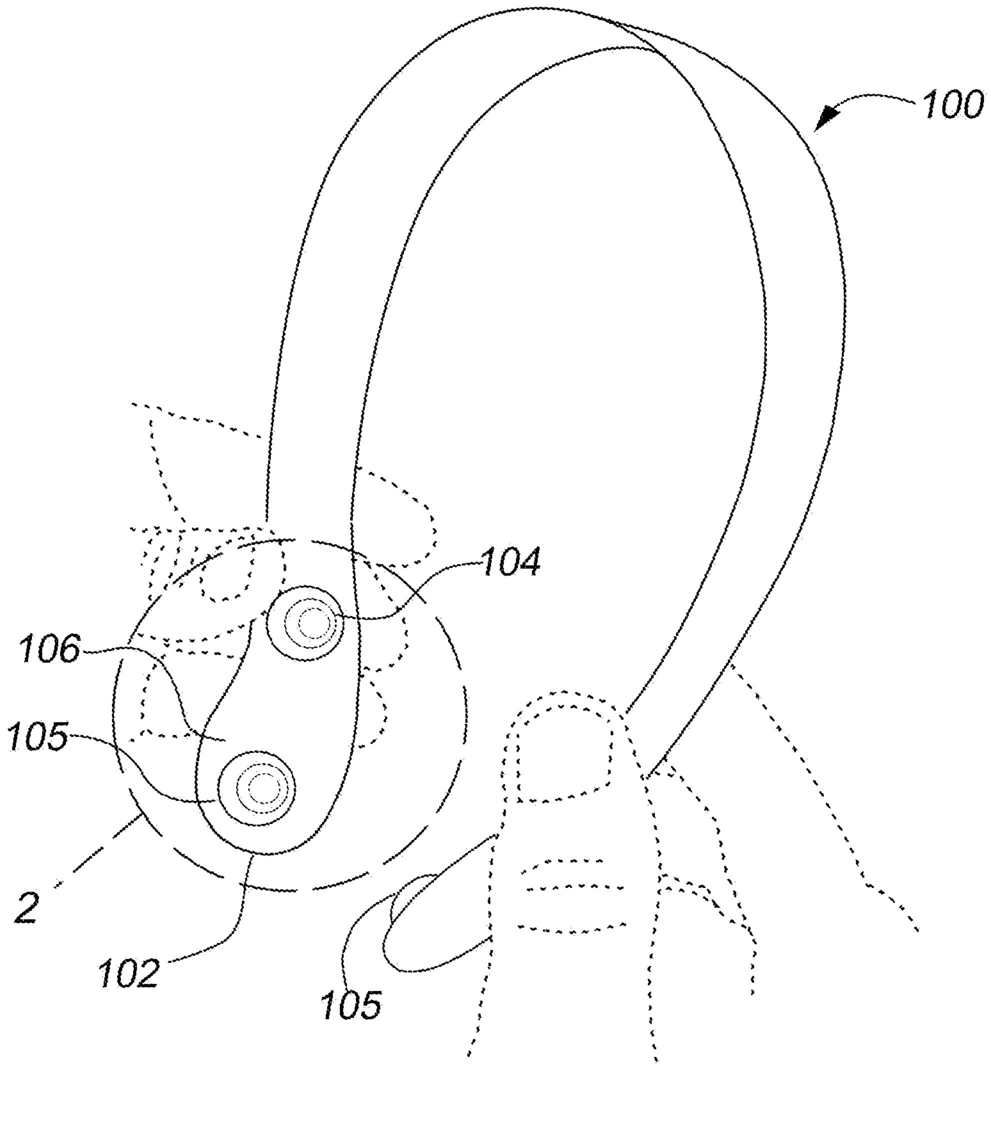
FIG. 1 is a perspective view of a headache relief headband.

100 body headache relief headband
102 lobe(s)
104 upper pressure element(s)
105 lower pressure element(s)
106 surface lobe(s)
108 upper pressure element boundary
110 lower pressure element boundary
112 magnet
113 vibratory motor
114 metal plate
116 track
118 track linkage
120 nose band
122 pads

SUMMARY OF THE INVENTION

A therapeutic headband applies controlled mechanical pressure to specific pressure points on the head, including the temples and the areas in front of and behind the ears. These regions are commonly associated with headache relief in acupressure and manual therapy techniques. The headband features adjustable pressure elements, allowing users to customize the intensity and location of pressure to suit individual needs.

The therapeutic headband is designed for comfort and adjustability, allowing users to control the pressure applied to each targeted area. This customization is achieved through adjustable pressure elements, such as sliding or magnetic pads, tension-controlled straps, or modular pressure nodes that can be repositioned along the headband.

The headband is non-invasive, non-electrical, and drug-free, making it a convenient and accessible solution for individuals seeking an alternative to pharmaceutical treatments or electronic stimulation devices. The design allows for discreet and prolonged use, making it suitable for daily wear at home, work, or during travel. The materials used in the construction may include soft fabric, elastic components, or cushioned pressure pads to enhance comfort while maintaining the necessary pressure for therapeutic benefits.

A general example implementation of present invention includes a headband body, the body being generally bilaterally symmetrical, the body including two distal ends that are lobate, a pair of movable protrusions on the lobate ends with skin contacting surfaces that may be domed, hemispherical or other suitable shape.

In an aspect combinable with the general example above, the moveable protrusions extend from a surface of each of the lobate ends and are moveable by the headband wearer to apply pressure to acupressure points corresponding to the wearer's temple and acupressure points generally in front of the wearer's ear lobes.

In an aspect combinable with any other example described herein, the movable protrusions are movable on the surfaces of the lobate ends anywhere within the border of a region.

In an aspect combinable with any other example described herein, in some implementations, the movable protrusions include a magnetic element that is magnetically attracted to a metal element contained within each of the lobate ends.

In an aspect combinable with any other example described herein, in some implementations, the movable protrusions are slidable within the border of a region defined by magnetic attraction. In such cases, a neodymium magnet, for example, may be embedded inside the movable protrusions and a metal plate may be embedded beneath the surface of the lobate ends with the dimensions of the plate corresponding to a magnetic boundary such that the protrusions are movable anywhere within the boundary. In some implementations, the surface of the lobate ends may include a slightly recessed portion corresponding generally to the bounds of the metal plate.

In an aspect combinable with any other example described herein, in some implementations, the movable protrusions are slidable side-to-side or trace an elliptical path within a magnetic boundary of the lobate ends wherein the magnetic attraction is such that the movable protrusions will maintain position unless intentionally re-positioned by a headband wearer.

In an aspect combinable with any other example described herein, in some implementations, the movable protrusions may be interchangeable, for example, a softer protrusion of soft foam may be changed out for one having a harder surface.

In an aspect combinable with any other example described herein, in some implementations, the movable protrusions may include a set of protrusions including protrusions with a relatively rounded contacting surface and others with a more pointed contacting surface.

In an aspect combinable with any other example described herein, in some implementations, the movable protrusions may include a set of protrusions including protrusions with a one or more surface contacting projections.

In an aspect combinable with any other example described herein, in some implementations, the movable protrusions may include an elastomeric surface.

In an aspect combinable with any other example described herein, in some implementations, a set of protrusions may include elements of various sizes.

In some implementations, the movable protrusions move within the bounds of a track, the protrusions held in the track by a linkage.

In some implementations, portions of the movable protrusions engaged with a track on the lobate ends are separable from other portions configured to apply acupressure to the skin surfaces of a wearer. Accordingly, in some implementations, such portions may be interchangeable with other contacting portions of various shapes and sizes. In such implementations, a spring may reside between the removable and interchangeable portions of the protrusions and the non-removable portions.

In some implementations, wherein the entire protrusion is removable from the lobate portions, a spring may reside between the contacting surface of the protrusion and a base portion so as to provide constant pressure against an acupressure site.

In an alternate implementation, an arcuate nose band or clip with pads at its ends is adapted to apply pressure to acupressure points at the sides of a wearer's nose bridge. Similarly to the headband implementation, the pads may be interchangeable so that a wearer can choose pads with size and surface characteristics depending on the wearer's preference.

Definitions

In the following description, the terms "headband" or "nose band" refer generally to any a bowed structure that has an untensioned state and a tensioned state. The headband and nose band may be constructed of any resilient material that has shape memory. In the context of this disclosure, the terms "protrusion" or "pad" refer to a movable element that may be fixed in a particular position, and intended to apply acupressure to areas of the human body. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." In case of conflict, the present specification, including explanations of terms, will control. In addition, the materials, methods, and examples are illustrative only and not intended to be limiting. In the various implementations depicted herein, it is intended that any aspect, object or feature of an implementation can be interchanged or shared with any aspect, object or feature of any other implementation depicted herein.

DETAILED DESCRIPTION OF THE INVENTION

Referring generally to FIGS. 1-12, an acupressure device includes a resilient headband with movable protrusions or pads, the protrusions are adapted to retain their position once re-positioned and are shaped and sized to apply pressure to certain acupressure points on the human head, particularly at the temples and forward of the ear lobes. The protrusions or pads can be made of any suitable material to provide the properties preferred by a wearer. In some implementations, the protrusions may be detachable and interchangeable with other protrusions of various materials, sizes and shapes. In some implementations, the protrusions are movable and held in place by magnetic attraction. In such implementations, a strong magnet may be inside the protrusion and a metal plate may be embedded beneath the surfaces of the lobate portions of the headband. In some implementations, the protrusions are held in place by a linkage whereby the protrusions are movable within the confines of a track embedded in the surfaces of the lobate portions. In the case of track type implementations, top portions of the protrusion may be detachable from other portions engaged with the linkage, and interchanged with other portions of various materials, sizes and shapes. In some implementations, the movable protrusions may include a gel core and be heated or chilled. In some implementations, the protrusions may include an elastomeric or foam over molded portions. In some implementations, the protrusions may be inflatable or include gel-based elements to apply gradual compression to acupressure points.

In order to use the headband, a wearer places the headband over his or her head, making note of the proximity of the protrusion to an acupressure point, e.g., temple, or adjacent the ear lobe, and relocate the protrusion to closely correspond to the respective acupressure location.

Regarding interchangeable portions of the movable protrusions, the interchangeable portions may be removably connected to the portions engaged with a linkage, or in the case of those magnetically repositionable, the entire protrusion may be swapped out for a different style or shape.

FIG. 1 is a perspective view of a preferred implementation of a therapeutic headband (100) that includes a curved resilient body (101) that terminates in two lobate portions (102) at the left and right side. The resilient body may be made of plastic or other material of suitable resiliency such that the headband tightly fits over the head of a wearer.

FIG. 2A is a perspective view of a lobate portion (102) including a surface (106) and an upper protrusion (104) and lower protrusion (105) wherein the upper protrusion is configured to apply acupressure to the temple region and the lower protrusion is configured to apply pressure to the acupressure point in front of the ear lobe. The lobate portions also include an upper boundary (108), both shown in dashed line, for the upper protrusion and a lower boundary (110) for the lower protrusion. In implementations including a magnetic attachment, in either boundary, the borders are determined by the dimensions of a metal plate (114) which attracts magnet (112), (FIG. 3A). FIG. 2B shows another position for the upper and lower protrusions of (FIG. 2A) wherein the protrusions can be positioned anywhere within the magnetic boundary. FIG. 3C shows another implementation that includes a vibratory element inside one or more of the protrusions that may provide an additional modality for pain relief at the acupressure locations. Such a vibratory element may be a small coin cell powered motor as are commonly found in cell phones. Activation of the vibratory motor may be initiated by contact with human skin via a capacitive touch sensor, a sliding switch or other means that will be appreciated by those having skill in the art.

Figure 2C:
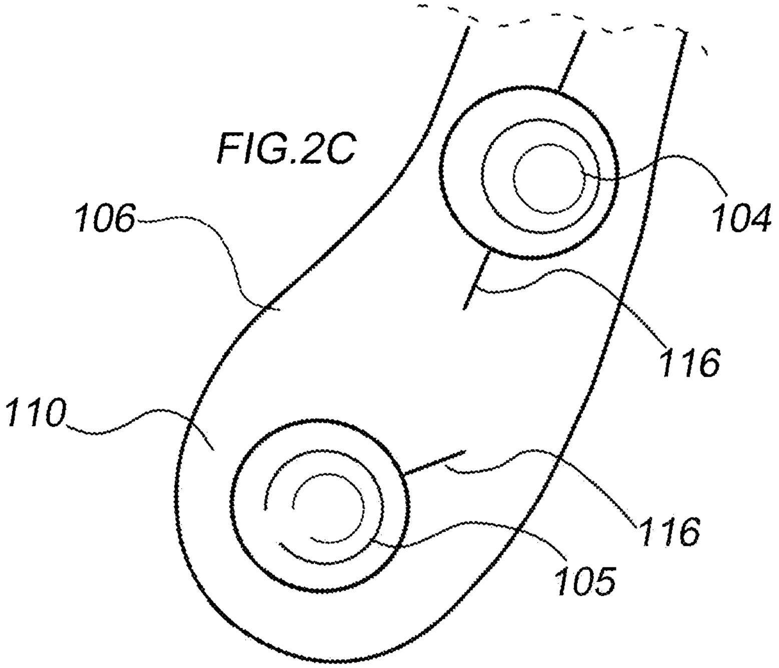
FIG. 2C is an enlarged detail view of call-out (2) in FIG. 1, showing an alternate embodiment.
Figure 2D:
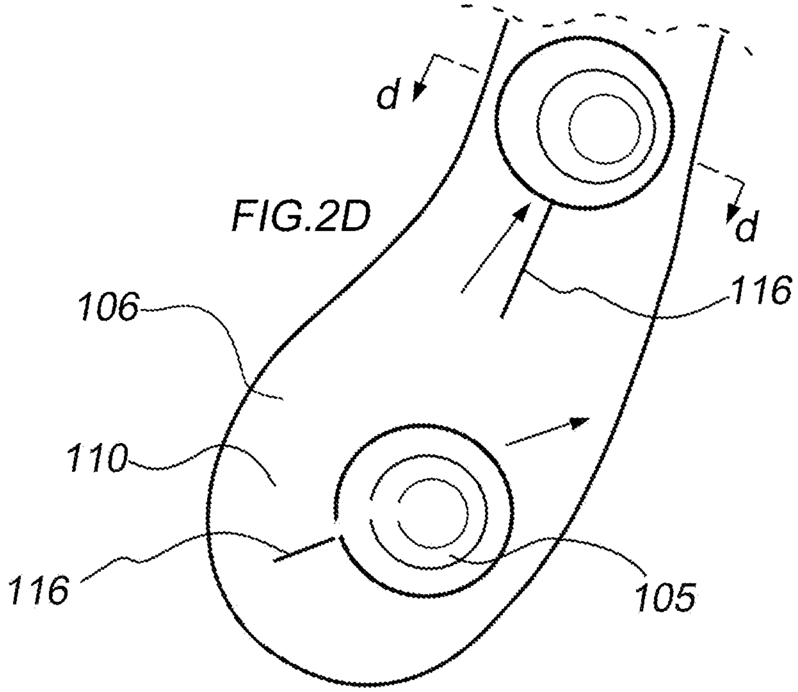
FIG. 2D is another view thereof.
Figure 3B:
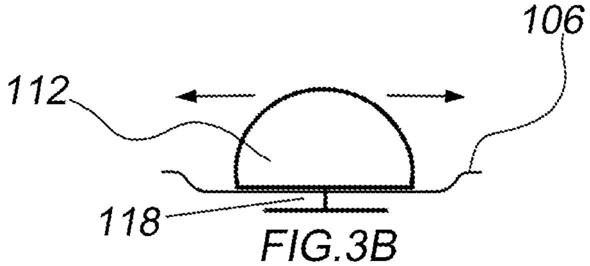
FIG. 3B is a cross-sectional view taken along lines d-d in FIG. 2D.
Figure 4:
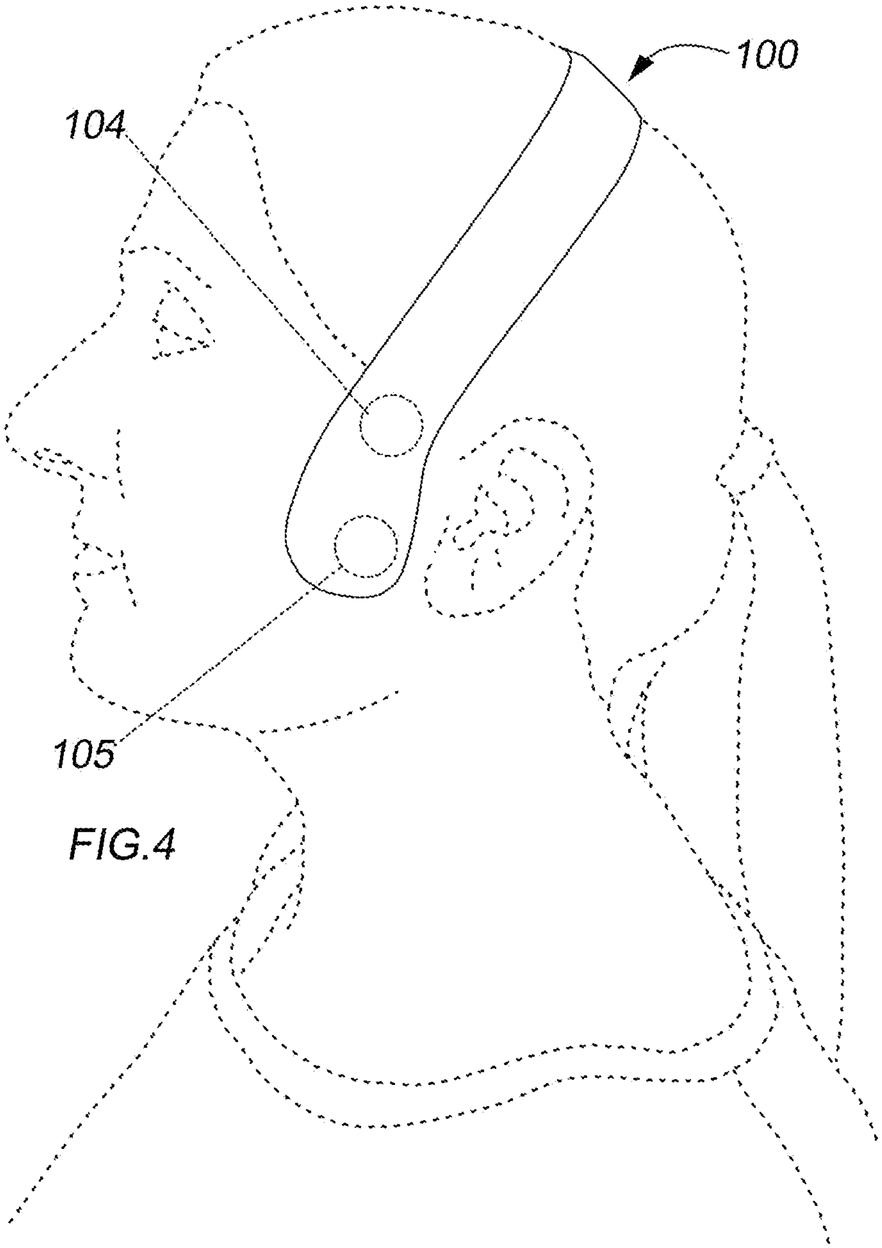
FIG. 4 is a side view of the headband as it would appear in use.
Figure 5:
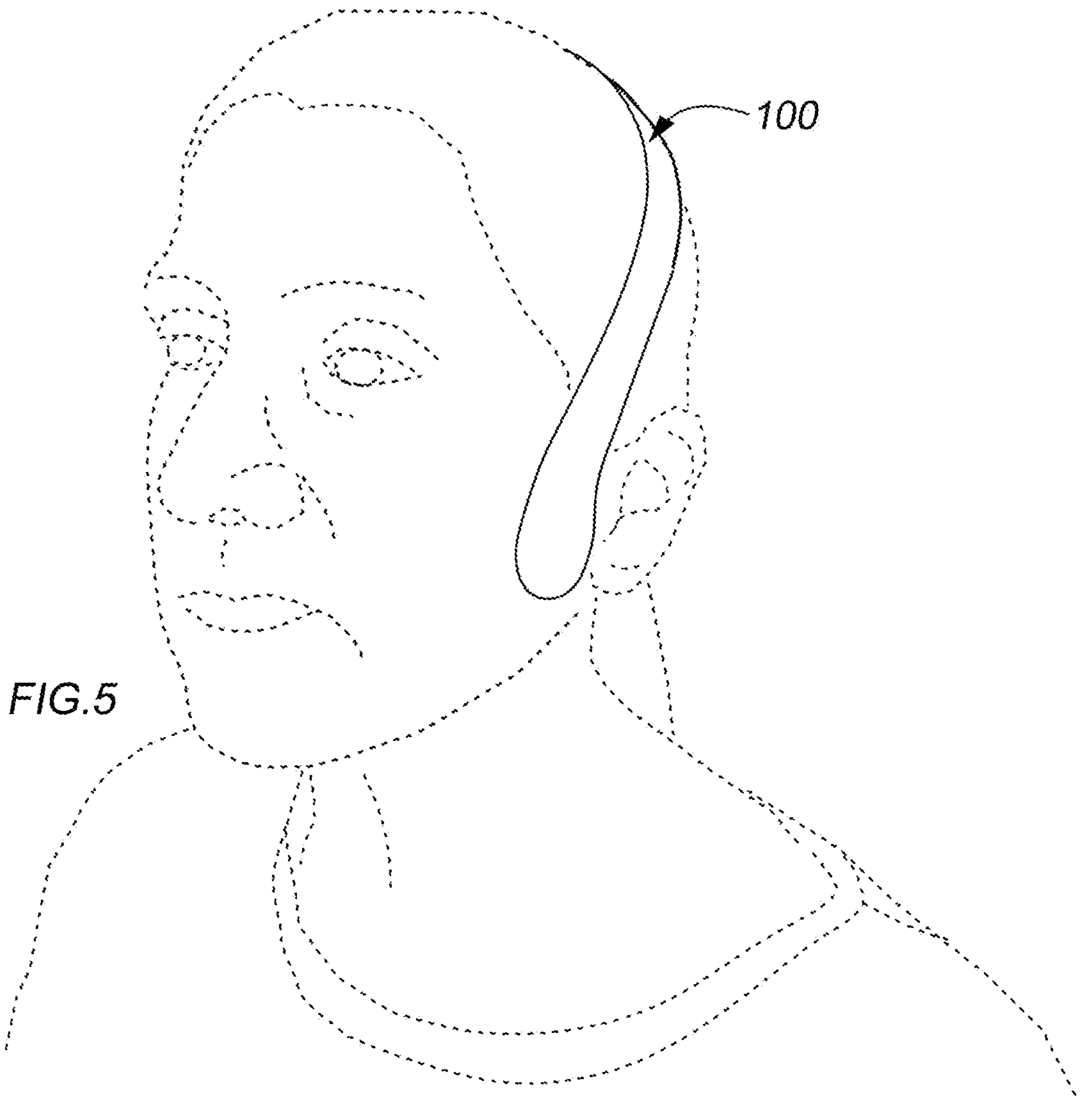
FIG. 5 is another perspective view thereof.
Figure 6:
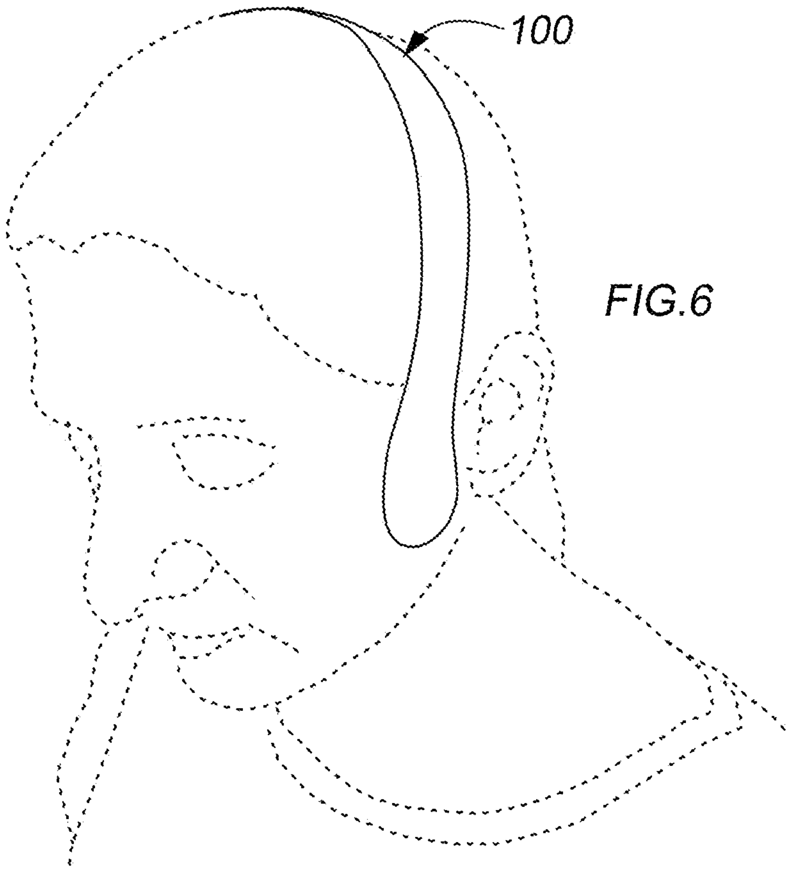
FIG. 6 is another perspective view thereof.
Figure 7:
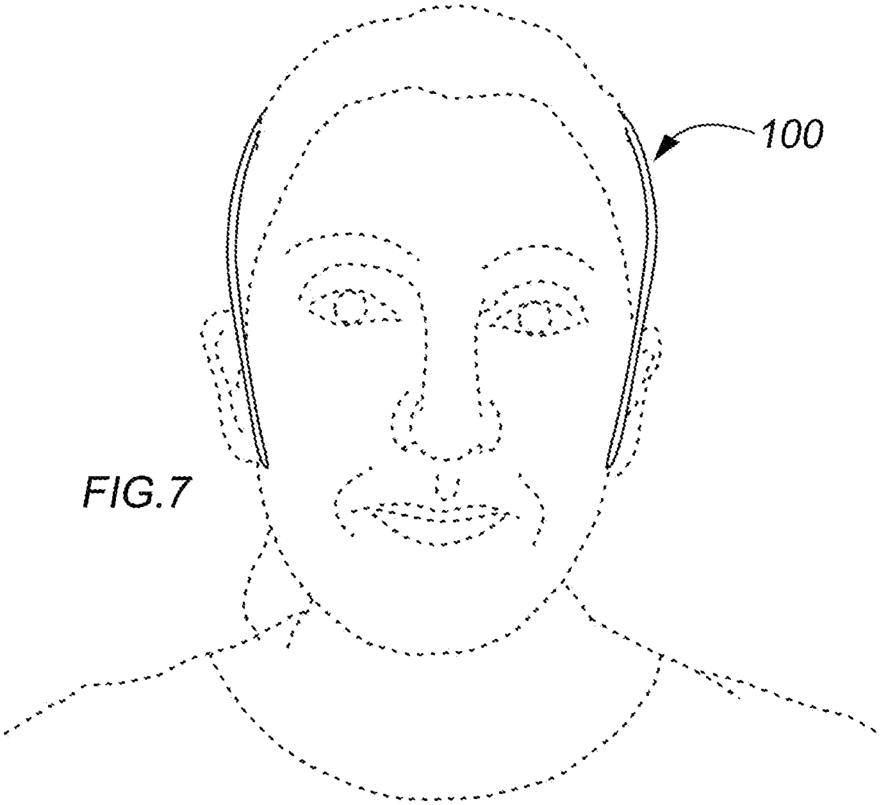
FIG. 7 is a front perspective view of the headband in use.
Figure 8:
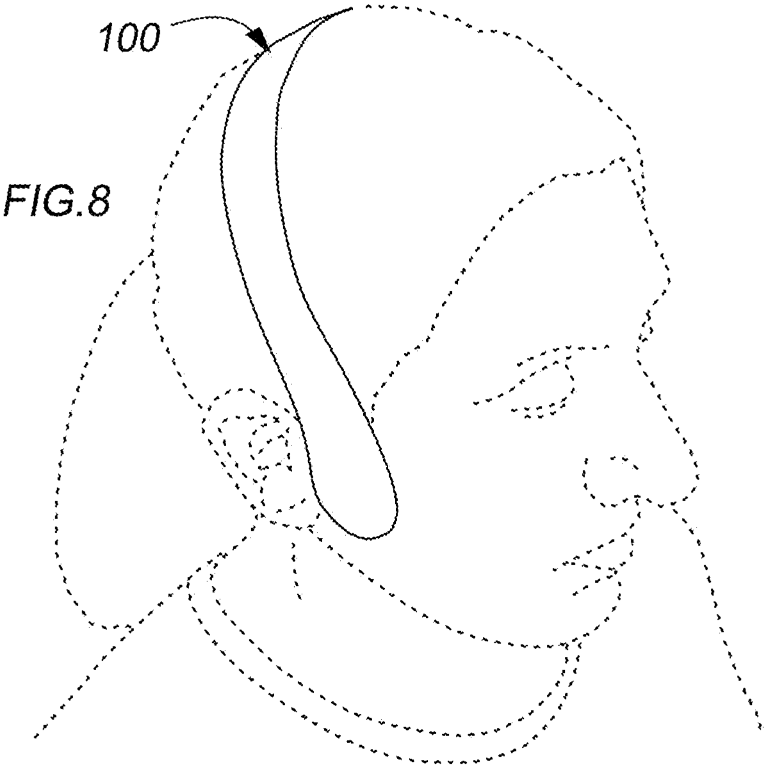
FIG. 8 is another perspective view thereof.

FIG. 2C is another implementation wherein the upper and lower protrusions of the lobate portions are movable along a track (116) being engaged therein by linkage (118) (FIG. 3B)

FIGS. 4-8 show the therapeutic headband in a typical use case.

Figure 9:
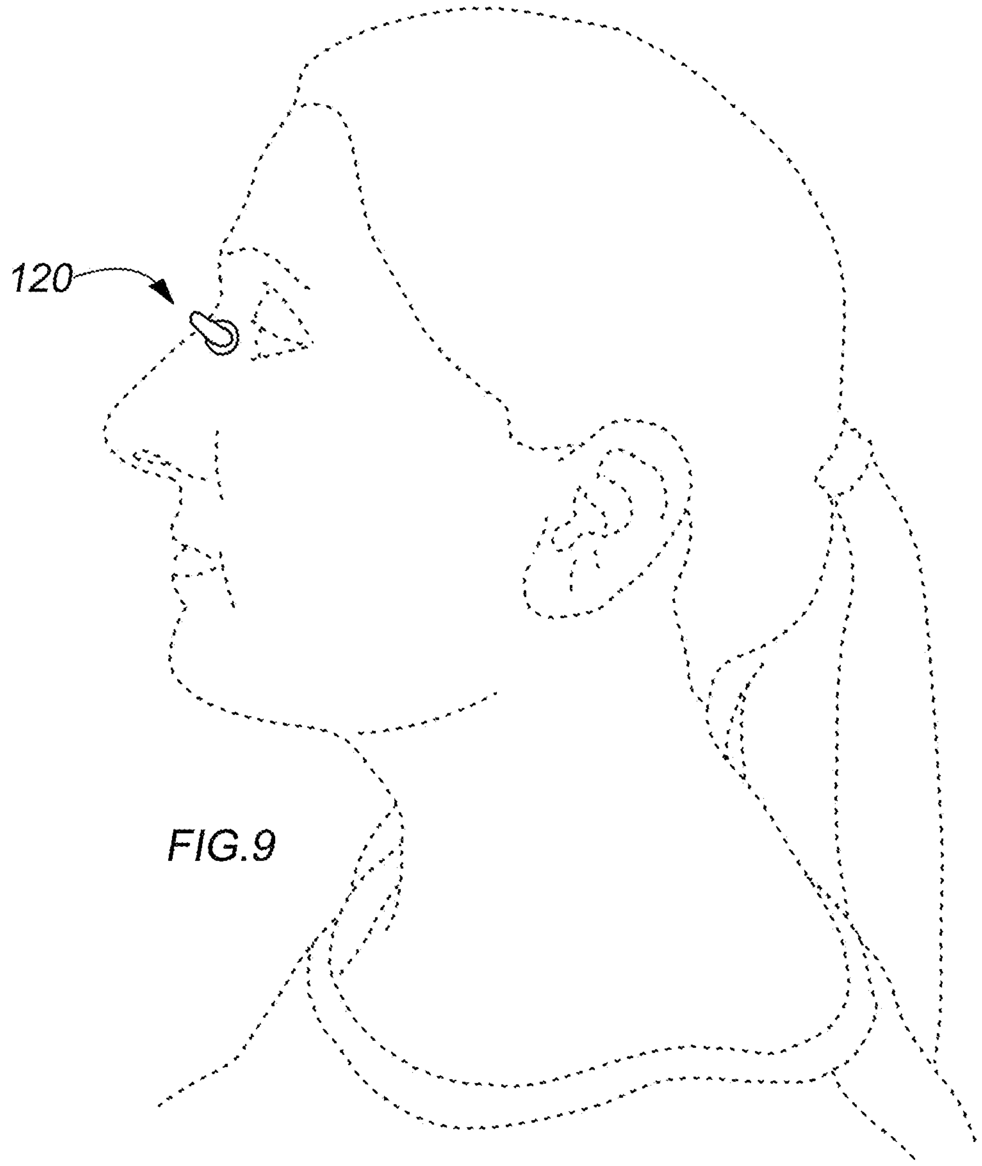
FIG. 9 shows an implementation of the invention configured to apply acupressure to the sides of a user's nose bridge.

FIG. 9 shows another implementation (120) adapted to apply acupressure to the sides of a wearer's nose bridge.

Figure 10:
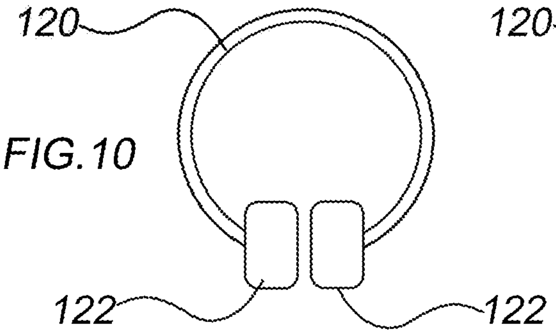
FIG. 10 is a front side elevation of a nose band.
Figure 11:
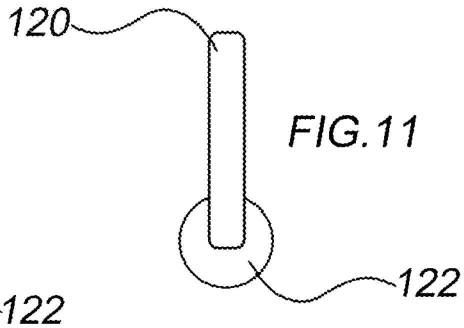
FIG. 11 is a side view thereof.

FIG. 10 is a front side elevation of the a nose band that includes two distal pads (122) adapted to apply pressure to the sides of a wearer's nose bridge. FIG. 11 is another side elevation thereof. In the case of the nose band, the pads are configured to apply pressure to the regions commonly known as "drilling bamboo" and "bright eyes" which roughly correspond to the nasal root left and right, and are thought to relieve headaches and migraines.

Figure 12:
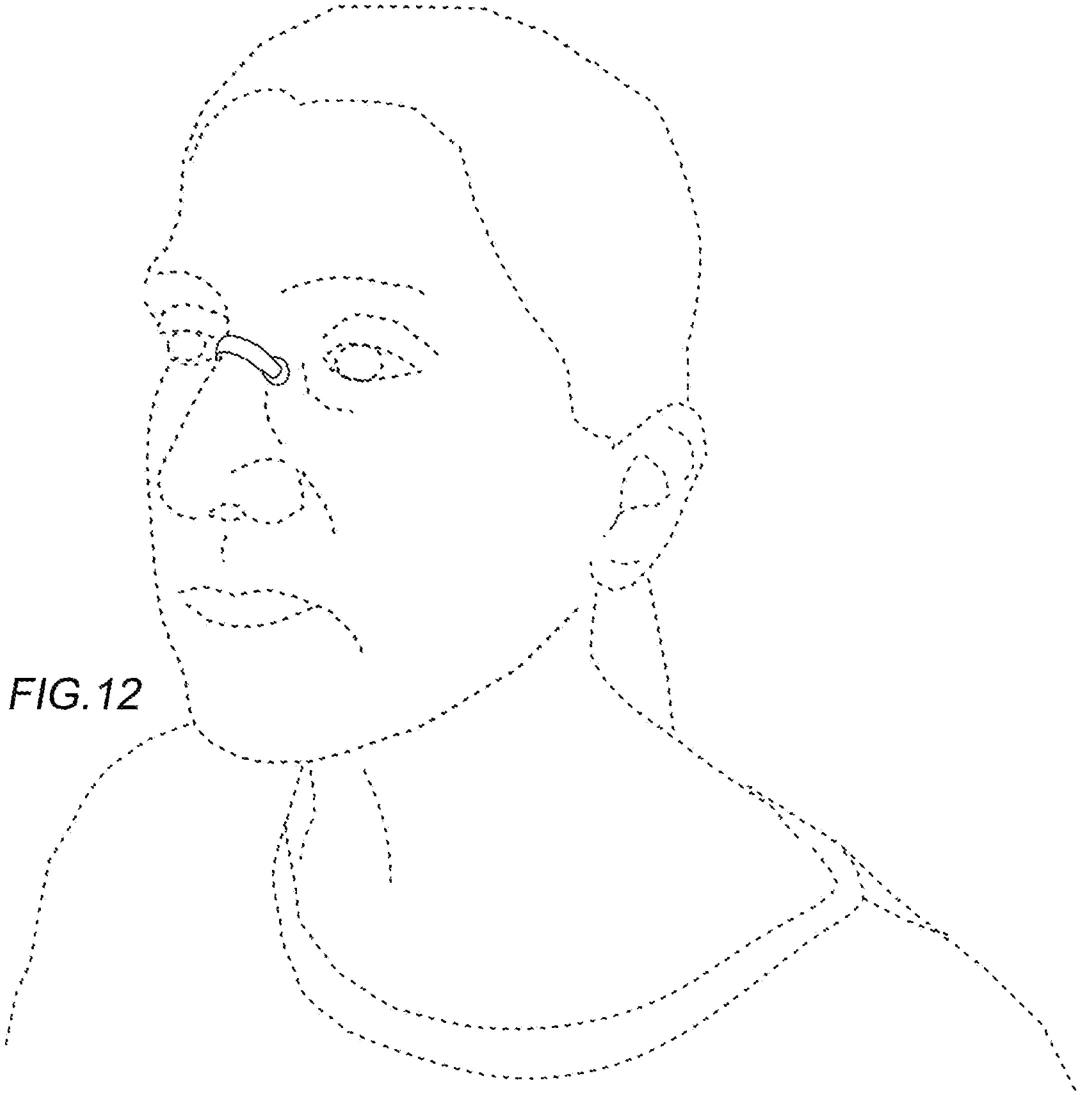
FIG. 12 is a perspective view of the nose band in a typical use environment.

FIG. 12 shows the nose band in another typical use case.

It should be understood that the drawings and detailed description herein are to be regarded in an illustrative rather than a restrictive manner and are not intended to be limiting to the particular implementations, forms and examples disclosed. In the above-described embodiments and implementations, the size, shape and the like shown in the accompanying drawing figures can be adjusted and still remain within the scope of this disclosure. Accordingly, it is intended that this disclosure encompass any further modifications, changes, rearrangements, substitutions, alternatives, design choices, and implementations as would be appreciated by those of ordinary skill in the art and falling within the spirit and scope of the following claims.

The invention claimed is:

1. A therapeutic headband for relieving headaches, migraines, and tension, comprising:

a flexible arc-shaped band with resilient shape memory including a right side and a left side configured to be worn around a user's head, the right and left sides of the flexible band are bilaterally symmetrical and each of the right and left sides include a distal lobate end with an outer facing surface and in inner facing surface;

a first set of domed pressure elements, each domed pressure element of the first set positioned on the left side lobate end inner facing surface of the band;

a second set of domed pressure elements, each domed pressure element of the second set positioned on the right side lobate end inner facing surface;

the domed pressure elements of the first and second sets are individually re-positionable atop respectively, the left side lobate end inner facing surface and the right side lobate end inner facing surface, to apply targeted pressure to at least a user's temples and areas in front of the user's ears;

the domed pressure elements of the first and second sets are magnetically retained and capable of slidable elliptical movement within a boundary on the inner facing surface of each of the right side and left side lobate ends respectively, corresponding to a magnetic region.

2. The therapeutic headband according to claim 1, the pressure elements of the first and second sets are interchangeable with pressure elements of an alternative set.

3. The therapeutic headband according to claim 1, the pressure elements of the first and second sets may vary in size and shape.

4. The therapeutic headband according to claim 1, the pressure elements of the first and second sets include contacting surfaces adapted to make contact with the user's skin.

5. The therapeutic headband according to claim 4, the contacting surfaces may be constructed of a material selected from at least one of the following: foam, plastic, elastomeric materials.

* * * * *